US012662156B2

(12) United States Patent
Liu et al.

(10) Patent No.: US 12,662,156 B2
(45) Date of Patent: Jun. 23, 2026

(54) DECISION-MAKING FOR AUTONOMOUS VEHICLE

(71) Applicant: APOLLO INTELLIGENT DRIVING TECHNOLOGY (BEIJING) CO., LTD., Beijing (CN)

(72) Inventors: Changchun Liu, Beijing (CN); Yabo Su, Beijing (CN); Yifeng Pan, Beijing (CN); Yixian Li, Beijing (CN); Han Deng, Beijing (CN); Jing Yang, Beijing (CN); Chao Wang, Beijing (CN); Zhenguang Zhu, Beijing (CN); Liang Peng, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 341 days.

(21) Appl. No.: 18/452,449

(22) Filed: Aug. 18, 2023

(65) Prior Publication Data

US 2023/0391362 A1     Dec. 7, 2023

(30) Foreign Application Priority Data

Aug. 31, 2022    (CN) .......................... 202211060552.2

(51) Int. Cl.
*B60W 60/00* (2020.01)
*B60W 30/095* (2012.01)

(52) U.S. Cl.
CPC ...... *B60W 60/001* (2020.02); *B60W 30/0956* (2013.01); *B60W 2554/4029* (2020.02)

(58) Field of Classification Search
CPC ........... B60W 60/001; B60W 30/0956; B60W 2554/4029; B60W 2554/402;
(Continued)

(56) References Cited

U.S. PATENT DOCUMENTS

| | | |
|---|---|---|
| 2018/0037434 A1 | 2/2018 | Yap |
| 2018/0105186 A1* | 4/2018 | Motomura ............ B60W 50/14 |

(Continued)

FOREIGN PATENT DOCUMENTS

| | | | |
|---|---|---|---|
| CN | 111282279 A | 6/2020 | |
| CN | 112052984 A * | 12/2020 | ............. G06N 3/045 |

(Continued)

*Primary Examiner* — Khoi H Tran
*Assistant Examiner* — Tristan J Greiner
(74) *Attorney, Agent, or Firm* — Seed IP Law Group LLP

(57) ABSTRACT

The disclosed techniques include: obtaining traveling state information of the autonomous vehicle; obtaining, in response to confirming that there is a traffic object within a preset range for the autonomous vehicle, true motion state information of the traffic object; determining a first control decision for indicating whether the autonomous vehicle is to avoid the traffic object based on the traveling state information of the autonomous vehicle and the true motion state information of the traffic object; predicting first predictive motion state information of the traffic object within a first preset duration based on the true motion state information of the traffic object and the first control decision; and determining a second control decision for the autonomous vehicle based on the traveling state information of the autonomous vehicle and the first predictive motion state information of the traffic object.

20 Claims, 5 Drawing Sheets

200

(58) Field of Classification Search
CPC . B60W 2554/4042; B60W 2554/4045; B60W
60/0011; B60W 60/00272; B60W
60/00274; B60W 50/0097
See application file for complete search history.

(56) References Cited

U.S. PATENT DOCUMENTS

| | | | | |
|---|---|---|---|---|
| 2019/0049968 | A1* | 2/2019 | Dean ................... | G05D 1/0255 |
| 2020/0249674 | A1* | 8/2020 | Dally .............. | B60W 60/00274 |
| 2020/0326719 | A1* | 10/2020 | Tram ............. | B60W 30/18159 |
| 2021/0149404 | A1* | 5/2021 | Zeng ...................... | G01S 17/89 |
| 2021/0188316 | A1* | 6/2021 | Marchetti-Bowick ...................... | |
| | | | | B60W 60/0011 |

FOREIGN PATENT DOCUMENTS

| | | | |
|---|---|---|---|
| CN | 112907967 | A | 6/2021 |
| CN | 114084155 | A | 2/2022 |
| CN | 114261404 | A | 4/2022 |
| CN | 114355793 | A | 4/2022 |
| CN | 114644018 | A | 6/2022 |
| CN | 114675742 | A | 6/2022 |
| CN | 114889642 | A | 8/2022 |
| CN | 114898293 | A | 8/2022 |
| DE | 102020206131 | A1 | 11/2021 |
| WO | WO 2022065021 | A1 | 3/2022 |

* cited by examiner

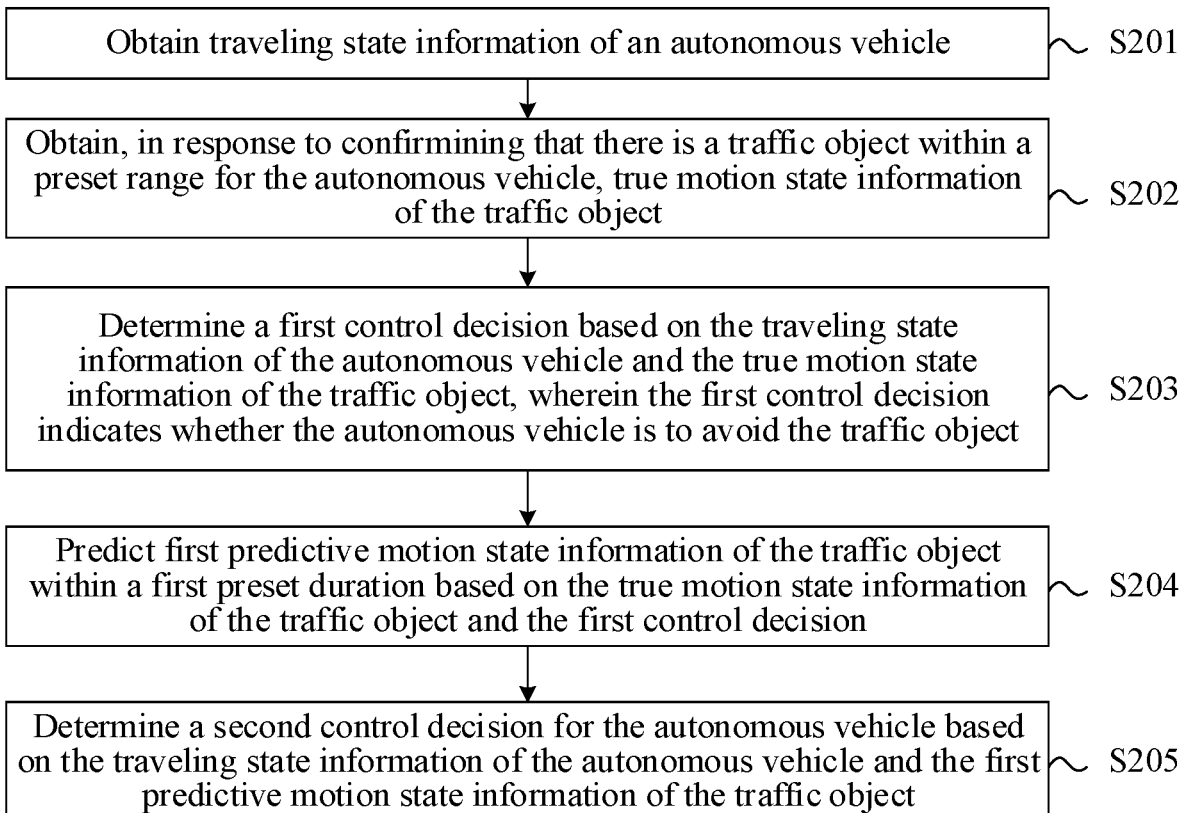

200

| Obtain traveling state information of an autonomous vehicle | S201 |

| Obtain, in response to confirmining that there is a traffic object within a preset range for the autonomous vehicle, true motion state information of the traffic object | S202 |

| Determine a first control decision based on the traveling state information of the autonomous vehicle and the true motion state information of the traffic object, wherein the first control decision indicates whether the autonomous vehicle is to avoid the traffic object | S203 |

| Predict first predictive motion state information of the traffic object within a first preset duration based on the true motion state information of the traffic object and the first control decision | S204 |

| Determine a second control decision for the autonomous vehicle based on the traveling state information of the autonomous vehicle and the first predictive motion state information of the traffic object | S205 |

*Fig. 2*

Decision-making model 300 for an autonomous vehicle

400

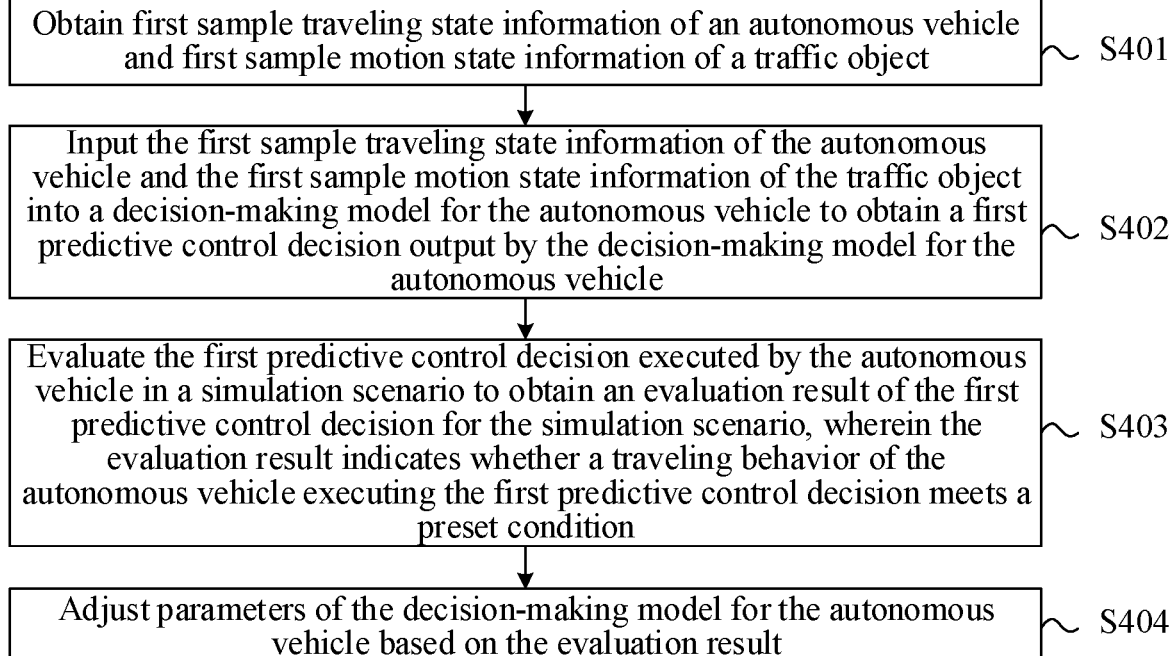

| Obtain first sample traveling state information of an autonomous vehicle and first sample motion state information of a traffic object | ᔕ S401 |

Input the first sample traveling state information of the autonomous vehicle and the first sample motion state information of the traffic object into a decision-making model for the autonomous vehicle to obtain a first predictive control decision output by the decision-making model for the autonomous vehicle — S402

Evaluate the first predictive control decision executed by the autonomous vehicle in a simulation scenario to obtain an evaluation result of the first predictive control decision for the simulation scenario, wherein the evaluation result indicates whether a traveling behavior of the autonomous vehicle executing the first predictive control decision meets a preset condition — S403

Adjust parameters of the decision-making model for the autonomous vehicle based on the evaluation result — S404

*Fig. 4*

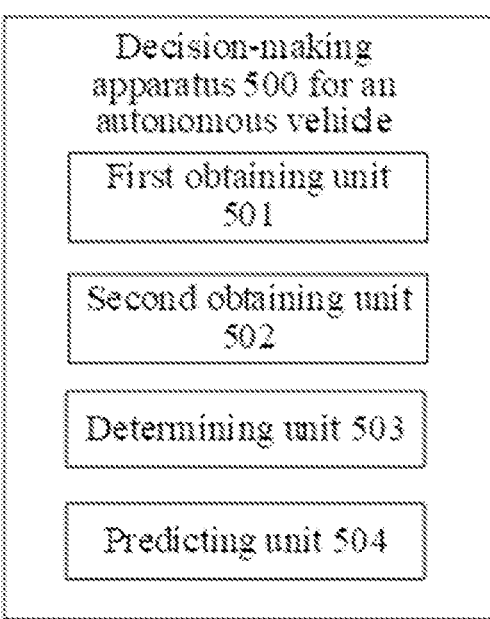

Decision-making
apparatus 500 for an
autonomous vehicle

First obtaining unit
501

Second obtaining unit
502

Determining unit 503

Predicting unit 504

*Fig. 5*

DECISION-MAKING FOR AUTONOMOUS VEHICLE

CROSS REFERENCE TO RELATED APPLICATION

This application claims priority to Chinese Patent Application No. 202211060552.2, filed on Aug. 31, 2022, the contents of which are hereby incorporated by reference in their entirety for all purposes.

BACKGROUND

Technical Field

The present disclosure relates to the technical field of artificial intelligence, particularly relates to the technical field of deep learning and automatic driving, and specifically relates to a decision-making method and apparatus for an autonomous vehicle, the vehicle, an electronic device, a computer readable storage medium and a computer program product.

Description of the Related Art

Artificial intelligence is a subject for studying to enable a computer to simulate a certain thought process and intelligent behavior (such as learning, reasoning, thinking and planning) of people, and has both a technology in a hardware level and a technology in a software level. An artificial intelligence hardware technology generally includes technologies such as a sensor, a dedicated artificial intelligence chip, cloud computing, distributed storage and big data processing. An artificial intelligence software technology mainly includes several major directions of a computer vision technology, a speech recognition technology, a natural language processing technology, machine learning/deep learning, a big data processing technology, a knowledge mapping technology, automatic driving, etc.

In a traveling process of an autonomous vehicle, it is necessary to utilize an automatic driving decision-making algorithm to obtain a corresponding control decision according to a current road condition, so that the vehicle can be driven reasonably.

A technique described in this part is not necessarily a technique that has been conceived or employed previously. Unless otherwise specified, it should not be assumed that any technique described in this part is regarded as the prior art only because it is included in this part. Similarly, unless otherwise specified, a problem mentioned in this part should not be regarded as being publicly known in any prior art.

BRIEF SUMMARY

The present disclosure provides a decision-making method and apparatus for an autonomous vehicle, the vehicle, an electronic device, a computer readable storage medium and a computer program product.

According to an aspect of the present disclosure, a decision-making method for an autonomous vehicle is provided, including: obtaining traveling state information of the autonomous vehicle; obtaining, in response to confirming that there is a traffic object within a preset range for the autonomous vehicle, true motion state information of the traffic object; determining a first control decision based on the traveling state information of the autonomous vehicle and the true motion state information of the traffic object, wherein the first control decision indicates whether the autonomous vehicle is to avoid the traffic object; predicting first predictive motion state information of the traffic object within a first preset duration based on the true motion state information of the traffic object and the first control decision; and determining a second control decision for the autonomous vehicle based on the traveling state information of the autonomous vehicle and the first predictive motion state information of the traffic object.

According to an aspect of the present disclosure, an electronic device is provided, including: one or more processors; a memory storing one or more programs configured to be executed by the one or more processors, the one or more programs including instructions for: obtaining traveling state information of the autonomous vehicle; obtaining, in response to confirming that there is a traffic object within a preset range for the autonomous vehicle, true motion state information of the traffic object; determining a first control decision based on the traveling state information of the autonomous vehicle and the true motion state information of the traffic object, wherein the first control decision indicates whether the autonomous vehicle is to avoid the traffic object; predicting first predictive motion state information of the traffic object within a first preset duration based on the true motion state information of the traffic object and the first control decision; and determining a second control decision for the autonomous vehicle based on the traveling state information of the autonomous vehicle and the first predictive motion state information of the traffic object.

According to an aspect of the present disclosure, a non-transitory computer-readable storage medium storing one or more programs is provided, the one or more programs comprising instructions, which when executed by one or more processors of an electronic device, cause the electronic device to: obtain traveling state information of the autonomous vehicle; obtain, in response to confirming that there is a traffic object within a preset range for the autonomous vehicle, true motion state information of the traffic object; determine a first control decision based on the traveling state information of the autonomous vehicle and the true motion state information of the traffic object, wherein the first control decision indicates whether the autonomous vehicle is to avoid the traffic object; predict first predictive motion state information of the traffic object within a first preset duration based on the true motion state information of the traffic object and the first control decision; and determine a second control decision for the autonomous vehicle based on the traveling state information of the autonomous vehicle and the first predictive motion state information of the traffic object.

According to one or more embodiments of the present disclosure, accuracy of the control decision for the autonomous vehicle can be improved.

It should be understood that the content described in this part is not intended to identify key or important features of the embodiments of the present disclosure, and is not used to limit the scope of the present disclosure as well. Other features of the present disclosure will become easily understood through the following specification.

BRIEF DESCRIPTION OF THE SEVERAL VIEWS OF THE DRAWINGS

Accompanying drawings in some embodiments show the embodiments, constitute a part of the specification, and together with text description of the specification, serve to explain example implementations of the embodiments. The shown embodiments are only for the purpose of illustration, and do not limit the scope of the claim. In all the accompanying drawings, the same reference numerals refer to the similar but not necessarily the same elements.

FIG. 2 shows a flow diagram of a decision-making method for an autonomous vehicle according to an example embodiment of the present disclosure.

FIG. 4 shows a flow diagram of a training method of a decision-making model for an autonomous vehicle according to an example embodiment of the present disclosure.

FIG. 5 shows a structural block diagram of a decision-making apparatus for an autonomous vehicle according to an example embodiment of the present disclosure.

DETAILED DESCRIPTION

The example embodiments of the present disclosure are illustrated below with reference to the accompanying drawings, including various details of the embodiments of the present disclosure for aiding understanding, and they should be regarded as being only example. Therefore, those ordinarily skilled in the art should realize that various changes and modifications may be made on the embodiments described here without departing from the scope of the present disclosure. Similarly, for clarity and simplicity, the following description omits description of a publicly known function and structure.

In the present disclosure, unless otherwise noted, describing of various elements by using terms "first," "second" and the like does not intend to limit a position relationship, a time sequence relationship or an importance relationship of these elements, and this kind of terms is only used to distinguish one component with another component. In some examples, a first element and a second element may refer to the same instance of this element, while in certain cases, they may also refer to different instances based on the contextual description.

The terms used in description of various examples in the present disclosure are only for the purpose of describing the specific examples, and are not intended to limit the present disclosure. Unless otherwise explicitly indicated in the context, if the quantity of the elements is not limited specially, there may be one or more elements. In addition, the term "and/or" used in the present disclosure covers any one of and all possible combination modes in the listed items.

In the related art, a motion state of a traffic object within a preset range around an autonomous vehicle is usually predicted first, and then a control decision for the autonomous vehicle is determined based on this, so that the autonomous vehicle is able to perform reasonable driving operation. However, in an actual traveling scenario, motion of the autonomous vehicle and motion of its surrounding traffic objects influence each other, that is, the control decision of the autonomous vehicle may influence the motion of the surrounding traffic objects.

The present disclosure provides a decision-making method for an autonomous vehicle, which is able to predict a motion state of other traffic objects based on a control decision of the autonomous vehicle, so that an avoidance or non-avoidance behavior of a current vehicle is able to influence a motion state prediction result of other traffic objects, and the control decision for the autonomous vehicle is determined again based on the obtained prediction result to improve decision-making accuracy.

An embodiment of the present disclosure will be described below in detail with reference to the accompanying drawings.

Figure 1:
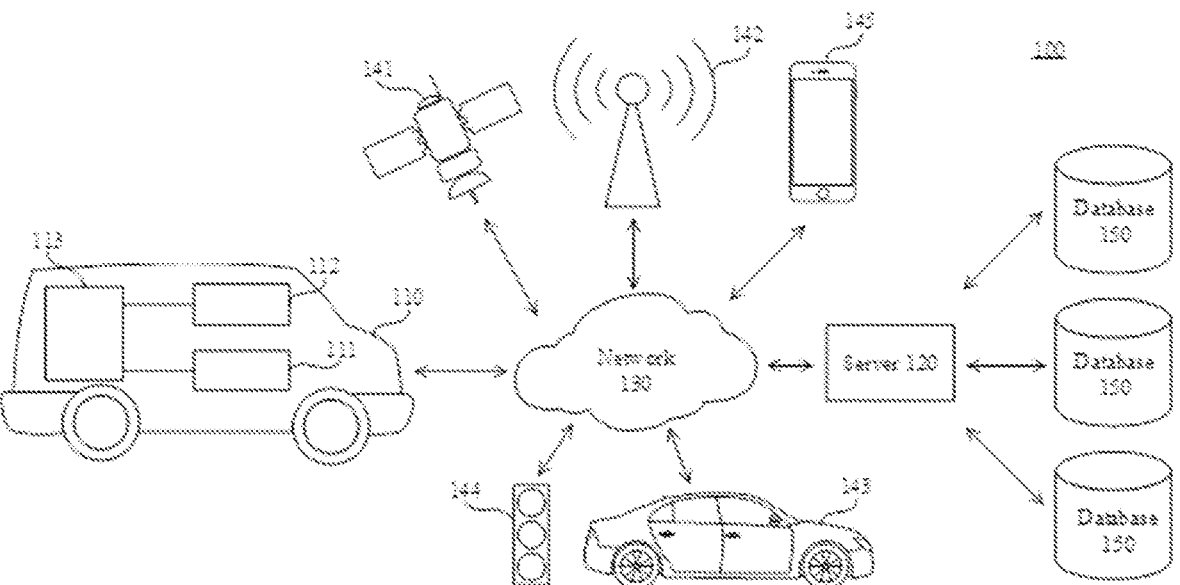
FIG. 1 shows a schematic diagram of an example system in which various methods described herein may be implemented according to an example embodiment of the present disclosure.

FIG. 1 shows a schematic diagram of an example system 100 in which various methods and apparatuses described herein may be implemented according to an embodiment of the present disclosure. Referring to FIG. 1, the system 100 includes a motor vehicle 110, a server 120, and one or more communication networks 130 for coupling the motor vehicle 110 to the server 120.

In the embodiment of the present disclosure, the motor vehicle 110 may include a computing device according to the embodiment of the present disclosure and/or be configured to execute a method according to the embodiment of the present disclosure.

The server 120 may run to be capable of implementing one or more service or software applications of a decision-making method for an autonomous vehicle. In certain embodiments, the server 120 may further provide other services or software applications which may include a non-virtual environment and a virtual environment. In configuration shown in FIG. 1, the server 120 may include one or more components for implementing functions executed by the server 120. These components may include a software component, a hardware component or their combinations capable of being executed by one or more processors. A user of the motor vehicle 110 may sequentially utilize one or more client application programs to interact with the server 120, so as to utilize the service provided by these components. It should be understood that various different system configurations are possible, which may be different from the system 100. Therefore, FIG. 1 is an example of a system used to implement various methods described herein, and is not intended to limit.

The server 120 may include one or more general-purpose computers, dedicated server computers (such as personal computer (PC) servers, UNIX servers, and midrange servers), blade servers, mainframe computers, server clusters or any other proper arrangements and/or combinations. The server 120 may include one or more virtual machines running a virtual operating system, or other computing architectures involving virtualization (such as one or more flexible pools of a logic storage device capable of being virtualized so as to maintain a virtual storage device of the server). In various embodiments, the server 120 may run one or more services or software applications providing the functions described hereunder.

A computing unit in the server 120 may run one or more operating systems including any above operating system and any commercially available server operating system. The server 120 may further run any one of various additional server application programs and/or a middle tier application program, including an HTTP server, an FTP server, a CGI server, a JAVA server, a database server, etc.

In some implementations, the server 120 may include one or more application programs, so as to analyze and merge data feed and/or event update received from the motor vehicle 110. The server 120 may further include one or more application programs, so as to display the data feed and/or a real-time event via one or more display devices of the motor vehicle 110.

A network 130 may be any type of network well known by those skilled in the art, and it may use any one of various available protocols (including but not limited to TCP/IP, SNA, IPX, etc.) to support data communication. As an example only, the one or more networks 130 may be a satellite communication network, a local area network (LAN), an Ethernet-based network, a Token-Ring, a wide area network (WAN), an Internet, a virtual network, a virtual private network (VPN), an intranet, an extranet, a blockchain network, a public switched telephone network (PSTN), an infrared network, a wireless network (such as Bluetooth and WiFi), and/or any combination of these and/or other networks.

The system 100 may further include one or more databases 150. In certain embodiments, these databases may be used to store data and other information. For example, one or more of the databases 150 may be used to store information such as an audio file and a video file. A data repository 150 may be resident at various positions. For example, the data repository used by the server 120 may be locally at a server 120, or may be away from the server 120, and may be in communication with the server 120 via network-based or dedicated connection. The data repository 150 may be different types. In certain embodiments, the data repository used by the server 120 may be a database, such as a relational database. One or more of these databases may store, update and retrieve data to the database and from the database in response to a command.

In certain embodiments, one or more of the databases 150 may further be used by the application program to store application program data. The database used by the application program may be different types of databases, such as a key value memory pool, an object memory pool, or a conventional memory pool supported by a file system.

The motor vehicle 110 may include a sensor(s) or sensor suite 111 used to sense a surrounding environment of and/or a moving or non-moving state of the motor vehicle 110. The sensor 111 may include one or more of the following sensors: a visual camera, an infrared camera, an ultrasonic sensor, a millimeter wave radar, and a laser radar (LiDAR). The different sensors may provide different detection precision and ranges. The camera may be installed in the front, rear or other positions of the vehicle. The visual camera may capture a situation inside and outside the vehicle in real time and present it to a driver and/or passengers. In addition, by analyzing pictures captured by the visual camera, information such as traffic light indication, intersection conditions, and other vehicle operation states may be obtained. The infrared camera may capture objects in a case of night vision. The ultrasonic sensor may be installed around the vehicle to measure a distance between the object outside the vehicle and the vehicle by utilizing characteristics such as strong directivity of ultrasonic waves. The millimeter wave radar may be installed in the front, rear or other positions of the vehicle to measure the distance between the object outside the vehicle and the vehicle by utilizing the characteristics of electromagnetic waves. The laser radar may be installed in the front, rear or other positions of the vehicle to detect edge and shape information of the object for object recognition and tracking. Due to a Doppler effect, a radar apparatus may further measure speed change of the vehicle and moving objects.

The motor vehicle 110 may further include a communication apparatus 112. The communication apparatus 112 may include a satellite positioning module able to receive satellite positioning signals (such as Beidou, GPS, GLONASS and GALILEO) from a satellite 141 and generating coordinates based on these signals. The communication apparatus 112 may further include a module for communicating with a mobile communication base station 142. The mobile communication network may implement any suitable communication technology, such as GSM/GPRS, CDMA, LTE and other current or developing wireless communication technologies (such as a 5G technology). The communication apparatus 112 may further have an Internet of vehicles or vehicle-to-everything (V2X) module, which is configured to realize, for example, vehicle-to-vehicle (V2V) communication with other vehicles 143 and vehicle-to-infrastructure (V2I) communication with the outside world with infrastructures 144. In addition, the communication apparatus 112 may further have a module configured to communicate with a user terminal 145 (including, but is not limited to, a smart phone, a tablet computer or a wearable apparatus such as a watch), for example, through a wireless local area network or Bluetooth by using an IEEE702.11 standard. By utilizing the communication apparatus 112, the motor vehicle 110 may further access the server 120 via the network 130.

The motor vehicle 110 may further include a control apparatus 113. The control apparatus 113 may include a processor communicating with various types of computer readable storage apparatuses or media, such as a central processing unit (CPU) or a graphics processing unit (GPU), or other dedicated processors. The control apparatus 113 may include an automatic driving system for automatically controlling various actuators in the vehicle. The automatic driving system is configured to control a power assembly, a steering system, a braking system and the like of the motor vehicle 110 (not shown) via the plurality of actuators in response to inputs from the plurality of sensors 111 or other input devices so as to control acceleration, steering and braking respectively without human intervention or with limited human intervention. The control apparatus 113 also is configured to control the operations of the sensors 111, e.g., in detecting a moving state of the motor vehicle and/or a moving state of a traffic object within a threshold range of the motor vehicle. For example, the control apparatus 113 causes sensors 111 to detect a motion state of the motor vehicle. Part of processing functions of the control apparatus 113 may be realized by cloud computing. For example, a vehicle-mounted processor may be used to execute some processing, while cloud computing resources may be utilized to execute other processing. The control apparatus 113 may be configured to execute the method according to the present disclosure. In addition, the control apparatus 113 may be implemented as an example of a computing device on a motor vehicle side (client) according to the present disclosure.

The system 100 in FIG. 1 may be configured and operated in various modes, so as to be able to apply various methods and apparatuses described according to the present disclosure.

FIG. 2 shows a flow diagram of a decision-making method 200 for an autonomous vehicle according to an example embodiment of the present disclosure. As shown in FIG. 2, the method 200 includes:

step S201, traveling state information of the autonomous vehicle is obtained;

step S202, in response to confirming that there is a traffic object within a preset range for the autonomous vehicle, true motion state information of the traffic object is obtained;

step S203, a first control decision is determined based on the traveling state information of the autonomous vehicle and the true motion state information of the traffic object, wherein the first control decision indicates whether the autonomous vehicle is to avoid the traffic object;

step S204, first predictive motion state information of the traffic object within a first preset duration is predicted based on the true motion state information of the traffic object and the first control decision; and step S205, a second control decision for the autonomous vehicle is determined based on the traveling state information of the autonomous vehicle and the first predictive motion state information of the traffic object.

Therefore, the first control decision used to indicate whether the autonomous vehicle is to avoid the traffic object can be determined based on the traveling state information of the autonomous vehicle and the true motion state information of the traffic object, and then the motion state of other traffic objects is predicted based on the first control decision, so that an avoidance or non-avoidance behavior of a current vehicle can influence a motion state prediction result of the traffic object, accuracy of motion state prediction of the traffic object can be improved, and then the second control decision for the autonomous vehicle is determined again based on the obtained prediction result, so as to improve decision-making accuracy.

In some examples, there may be the plurality of traffic objects within the preset range for the autonomous vehicle. In this case, the true motion state information corresponding to the traffic object may be obtained for each traffic object, and then the control decision for the autonomous vehicle is obtained by utilizing the above method 200, so as to indicate whether the autonomous vehicle is to avoid the traffic object.

In some examples, the traveling state information of the autonomous vehicle described in step S201 may include a position, speed information and the like of the autonomous vehicle. In one example, the traveling state information of the autonomous vehicle may be traveling track information of the autonomous vehicle, and the traveling track information includes position information of the autonomous vehicle at multiple times, so that the speed information of the autonomous vehicle may be determined based on this.

For example, the sensors 111, e.g., accelerometers, gyroscopes, other motion sensors, GPS or other satellite-based positioning sensors or other sensors, may be used to detect or sense the travel state of the autonomous vehicle. The readings of the sensors are received and processed by the control apparatus 113 to obtain the travelling state information.

According to some embodiments, the traffic object includes at least one of the following items: a pedestrian, a non-motor vehicle and a motor vehicle. But not limited to this, in some examples, the traffic object may also include other dynamic obstacles that may influence traveling of the autonomous vehicle.

For example, the sensors 111, e.g., time-of-flight or laser based ranging sensors, laser radar-based sensors or other sensors, may be used to detect or sense the motion state of the traffic object. The readings of the sensors are received and processed by the control apparatus 113 to obtain the true motion state information.

In some examples, the true motion state information of the traffic object described in step S202 may include a type, size, position, speed information and the like of the traffic object. In one example, the true motion state information of the traffic object may be motion track information of the traffic object.

According to some embodiments, the method 200 may include: second predictive motion state information of the traffic object within a second preset duration is predicted based on the true motion state information of the traffic object and the second control decision; and a third control decision for the autonomous vehicle is determined based on the traveling state information of the autonomous vehicle and the second predictive motion state information of the traffic object. Therefore, the motion state of the traffic object can be predicted again based on the second control decision, and the third control decision for the autonomous vehicle can be determined again based on this to further improve the decision-making accuracy.

In some examples, the first preset duration and the second preset duration may be set manually according to actual needs, and they may be the same or different, which is not limited.

In some examples, the above steps may further be executed repeatedly for the obtained motion state prediction result of the traffic object and the control decision for the autonomous vehicle. The steps of motion state prediction of the traffic object-determining the control decision based on the prediction result are executed through a plurality of rounds of iterations to further optimize the obtained control decision for the autonomous vehicle. In an actual application process, corresponding parameters may be set manually according to experience to repeatedly execute the above steps based on a fixed number of rounds.

In general, traveling of the autonomous vehicle and the motion of the traffic object are further limited by other factors. For example, it may be various prohibitive provisions formulated by a traffic management department according to laws and regulations for the vehicle and the pedestrians to pass on the road and other traffic-related activities, such as no left turn, no U-turn, and no motor vehicles. For another example, it may further be traffic restrictions caused by objective reasons such as road form.

Based on this, according to some embodiments, the method 200 further includes: traveling scenario information is obtained, and the traveling scenario information indicates motion restriction information for the autonomous vehicle and the traffic object in a traveling scenario, wherein, in step S203, determining the first control decision based on the traveling state information of the autonomous vehicle and the true motion state information of the traffic object includes: the first control decision is determined based on the traveling state information of the autonomous vehicle, the true motion state information of the traffic object and the traveling scenario information; and wherein, in step S204, predicting the first predictive motion state information of the traffic object within the first preset duration based on the true motion state information of the traffic object and the first control decision includes: the first predictive motion state information of the traffic object within the first preset duration is predicted based on the true motion state information of the traffic object, the first control decision and the traveling scenario information. Therefore, based on the motion restriction information for the autonomous vehicle and the traffic object in a current traveling scenario, it is possible to determine the control decision for the autonomous vehicle more accurately and predict the motion state of the traffic object.

In some examples, the traveling scenario information includes road form information, traffic signs, road traffic guidance information, traffic signal light information and the like within a preset range to indicate the motion restriction information for the autonomous vehicle and the traffic object more comprehensively and accurately.

According to some embodiments, in step S203, determining the first control decision based on the traveling state information of the autonomous vehicle and the true motion state information of the traffic object includes: the traveling state information of the autonomous vehicle and the true motion state information of the traffic object are input into an automatic driving decision-making model to obtain the first control decision output by the automatic driving decision-making model; and in step S205, determining the second control decision based on the traveling state information of the autonomous vehicle and the first predictive motion state information of the traffic object includes: the traveling state information of the autonomous vehicle and the first predictive motion state information of the traffic object are input into the automatic driving decision-making model to obtain the second control decision output by the automatic driving decision-making model. Therefore, the automatic driving decision-making model can be utilized to obtain the control decision for the autonomous vehicle, which is simpler and more efficient.

According to some embodiments, in step S204, predicting the first predictive motion state information of the traffic object within the first preset duration based on the true motion state information of the traffic object and the first control decision includes: the true motion state information of the traffic object and the first control decision are input into a motion state prediction model to obtain the first predictive motion state information output by the motion state prediction model. Therefore, the motion state prediction model can be utilized to predict the motion state of the traffic object, which is simpler and more efficient.

In some examples, the automatic driving decision-making model and the motion state prediction model may be obtained by utilizing a marked training data set in advance and training in a supervised way. As long as the corresponding functions can be realized, the present disclosure does not limit the structure and training mode of the automatic driving decision-making model and the motion state prediction model.

Figure 3:
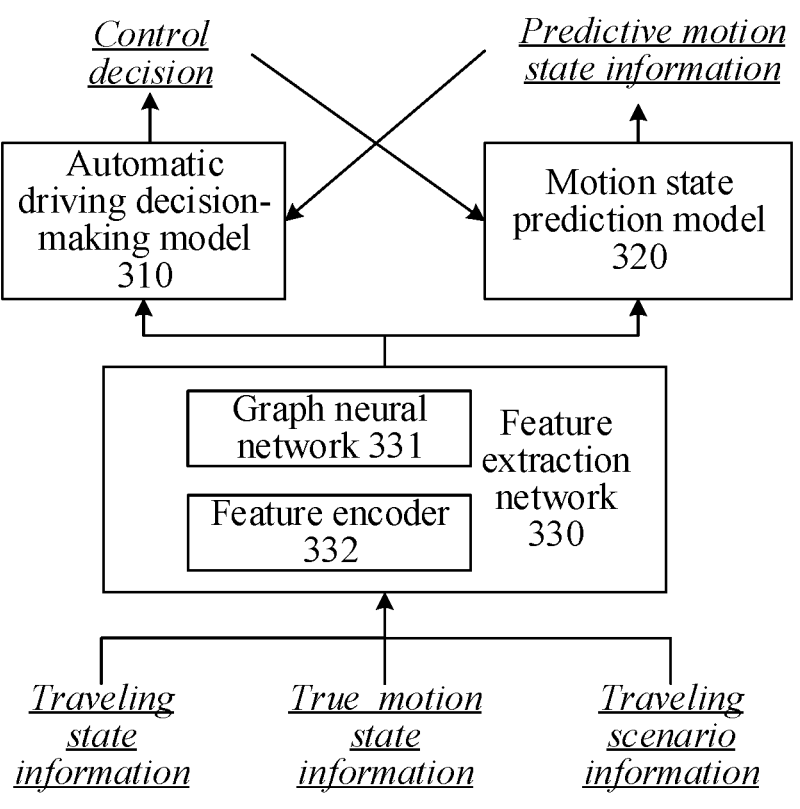
FIG. 3 shows a schematic structural diagram of a decision-making model for an autonomous vehicle according to an example embodiment of the present disclosure.

In some examples, the automatic driving decision-making model and the motion state prediction model may jointly constitute the decision-making model for the autonomous vehicle. FIG. 3 shows a schematic structural diagram of the decision-making model 300 for the autonomous vehicle according to an example embodiment of the present disclosure.

Referring to FIG. 3, the decision-making model 300 for the autonomous vehicle includes an automatic driving decision-making model 310, a motion state prediction model 320, and a feature extraction network 330. The feature extraction network 330 is configured to output corresponding feature information based on the traveling state information of the autonomous vehicle, the true motion state information of the traffic object, and the traveling scenario information, so that the automatic driving decision-making model 310 and the motion state prediction model 320 can output the corresponding control decision and predictive motion state information based on the feature information.

As shown in FIG. 3, the feature extraction network 330 may include a feature encoder 331 and a Graph neural network 332. The feature encoder 331 is used to encode based on input information, so as to obtain a preliminary traveling state feature of the autonomous vehicle, a true motion feature of the traffic object and a traveling scenario feature. The Graph neural network 332 is used to perform further feature extraction and fusion based on a content output by the feature encoder 331, so that the content input to the automatic driving decision-making model 310 and the motion state prediction model 320 is able to more accurately and comprehensively represent the feature information of the autonomous vehicle, the traffic object and the traveling scenario, thus improving the accuracy of model prediction.

In some examples, other types of neural networks other than the Graph neural network may also be used to perform further feature extraction and fusion based on the content output by the feature encoder 331, which is not limited.

The applicant noted that in the related art, training of the decision-making model for the autonomous vehicle is usually performed by utilizing real road test data, and then tested in a real road scenario. However, a road test in the real scenario has higher cost and insufficient safety. Before applying the decision-making model for the autonomous vehicle to the real road scenario, there is a lack of credible evaluation system to provide effective feedback for the model.

Based on this, the present disclosure further provides a training method of a decision-making model for an autonomous vehicle based on simulation evaluation, and the decision-making model for the autonomous vehicle includes an automatic driving decision-making model and a motion state prediction model. FIG. 4 shows a flow diagram of a training method 400 of the decision-making model for the autonomous vehicle according to an example embodiment of the present disclosure. As shown in FIG. 4, the method 400 includes:

step S401, first sample traveling state information of the autonomous vehicle and first sample motion state information of a traffic object are obtained;

step S402, the first sample traveling state information of the autonomous vehicle and the first sample motion state information of the traffic object are input into the decision-making model for the autonomous vehicle to obtain a first predictive control decision output by the decision-making model for the autonomous vehicle, wherein the decision-making model for the autonomous vehicle is configured to obtain the first predictive control decision through the following steps: the first sample traveling state information of the autonomous vehicle and the first sample motion state information of the traffic object are input into the automatic driving decision-making model to obtain a fourth control decision output by the automatic driving decision-making model, wherein the fourth control decision indicates whether the autonomous vehicle is to avoid the traffic object; the first sample motion state information of the traffic object and the fourth control decision are input into the motion state prediction model to obtain third predictive motion state information of the traffic object within a third preset duration output by the motion state prediction model; and the first sample traveling state information of the autonomous vehicle and the third predictive motion state information of the traffic object are input into the automatic driving decision-making model to obtain the first predictive control decision output by the automatic driving decision-making model;

step S403, the first predictive control decision in a simulation scenario in which the first predictive control decision is executed by the autonomous vehicle is evaluated to obtain an evaluation result of the first predictive control decision for the simulation scenario, and the evaluation result indicates whether a traveling behavior of the autonomous vehicle executing the first predictive control decision meets a threshold; and step S404, parameters of the decision-making model for the autonomous vehicle are adjusted based on the evaluation result.

Therefore, the decision-making model for the autonomous vehicle can be trained by utilizing the simulation scenario simulating real road complexity, model control performance is evaluated by utilizing the performance of the autonomous vehicle in the simulation environment, and the parameters of the decision-making model for the autonomous vehicle are adjusted based on the simulation evaluation result, so as to obtain the decision-making model for the autonomous vehicle with optimized performance, and improve the accuracy of the control decision of the autonomous vehicle.

In some examples, a preset condition that needs to be met by the traveling behavior of the autonomous vehicle to execute the first predictive control decision may cover dimensions such as whether the vehicle complies with the traffic regulations, an actual riding sense of the vehicle, a traveling safety coefficient of the vehicle, and an intelligent response speed of the vehicle. For example, the preset condition may include: the vehicle does not run a red light, the vehicle does not brake hard, the vehicle does not drive out of the road, the vehicle does not collide with the traffic object, and the like.

In some examples, the above steps may further be executed repeatedly for the decision-making model for the autonomous vehicle obtained after each parameter adjustment, and the steps of simulation evaluation-model parameter adjustment are executed through a plurality of rounds of iterations to further optimize the performance of the model.

As described above, the training data of the decision-making model for the autonomous vehicle are usually obtained in the real road scenario, and the obtaining cost of the training data is higher.

Based on this, according to some embodiments, the method 400 further includes: a label for the first predictive control decision is determined based on the evaluation result, and the label indicates that the first predictive control decision is a positive sample or a negative sample; second sample traveling state information of the autonomous vehicle and second sample motion state information of the traffic object when the autonomous vehicle executes the first predictive control decision in the simulation scenario are obtained; the second sample traveling state information of the autonomous vehicle and the second sample motion state information of the traffic object are input into the decision-making model for the autonomous vehicle to obtain a second predictive control decision output by the decision-making model for the autonomous vehicle; and parameters of the decision-making model for the autonomous vehicle are adjusted based on the first predictive control decision, the label and the second predictive control decision.

Therefore, the motion data of the autonomous vehicle and the traffic object obtained in the simulation evaluation process can be used as training data again to train the model, and the effect of model training can be improved by expanding the scale of a training data set. At the same time, by marking the first predictive control decision, the label can be utilized to indicate feasibility of the second predictive control decision and improve the effect of model training.

In some examples, the data obtained in the simulation evaluation process can be screened according to a preset rule, and screened data are utilized to train the model. For example, for the simulation scenario with higher decision-making complexity and difficulty, corresponding data may be obtained to train the model again to improve the performance of the model in a complex and difficult scenario.

According to another aspect of the present disclosure, a decision-making apparatus for an autonomous vehicle is further provided. FIG. 5 shows a structural block diagram of the decision-making apparatus 500 for the autonomous vehicle according to an example embodiment of the present disclosure. As shown in FIG. 5, the apparatus 500 includes:

a first obtaining unit 501, configured to obtain traveling state information of the autonomous vehicle;

a second obtaining unit 502, configured to obtain, in response to confirming that there is a traffic object within a preset range for the autonomous vehicle, true motion state information of the traffic object;

a determining unit 503, configured to determine a first control decision based on the traveling state information of the autonomous vehicle and the true motion state information of the traffic object, wherein the first control decision indicates whether the autonomous vehicle is to avoid the traffic object; and a predicting unit 504, configured to predict first predictive motion state information of the traffic object within a first preset duration based on the true motion state information of the traffic object and the first control decision, wherein the determining unit 503 is further configured to determine a second control decision for the autonomous vehicle based on the traveling state information of the autonomous vehicle and the first predictive motion state information of the traffic object.

According to some embodiments, the predicting unit 504 is further configured to predict second predictive motion state information of the traffic object within a second preset duration based on the true motion state information of the traffic object and the second control decision; and the determining unit 503 is further configured to determine a third control decision for the autonomous vehicle based on the traveling state information of the autonomous vehicle and the second predictive motion state information of the traffic object.

According to some embodiments, the traffic object includes at least one of the following items: a pedestrian, a non-motor vehicle and a motor vehicle.

According to some embodiments, the determining unit 503 is configured to input the traveling state information of the autonomous vehicle and the true motion state information of the traffic object into an automatic driving decision-making model to obtain the first control decision output by the automatic driving decision-making model, and is further configured to input the traveling state information of the autonomous vehicle and the first predictive motion state information of the traffic object into the automatic driving decision-making model to obtain the second control decision output by the automatic driving decision-making model.

According to some embodiments, the predicting unit 504 is configured to input the true motion state information of the traffic object and the first control decision into a motion state prediction model to obtain the first predictive motion state information output by the motion state prediction model.

According to some embodiments, the apparatus 500 further includes: a third obtaining unit, configured to obtain traveling scenario information, wherein the traveling scenario information indicates motion restriction information for the autonomous vehicle and the traffic object in a traveling scenario, wherein, the determining unit 503 is configured to: determine the first control decision based on the traveling state information of the autonomous vehicle, the true motion state information of the traffic object and the traveling scenario information, and the predicting unit 504 is configured to: predict the first predictive motion state information of the traffic object within the first preset duration based on the true motion state information of the traffic object, the first control decision and the traveling scenario information.

The operation of the unit 501-unit 504 of the decision-making apparatus 500 for the autonomous vehicle is similar to the operation of step S201-step S205 described previously, which will not be repeated here.

Figure 6:
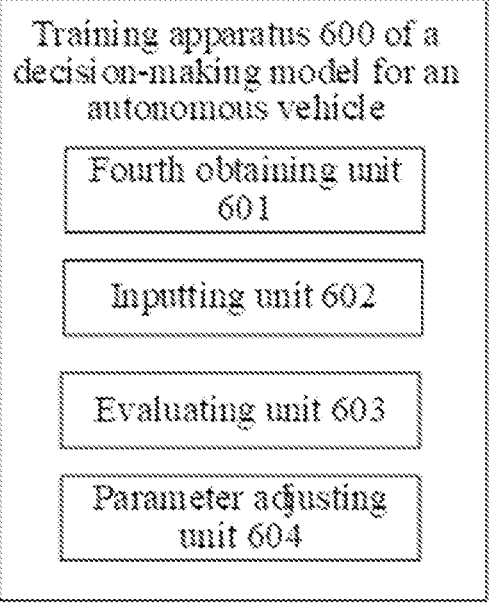
FIG. 6 shows a structural block diagram of a training apparatus of a decision-making model for an autonomous vehicle according to an example embodiment of the present disclosure.
Figure 7:
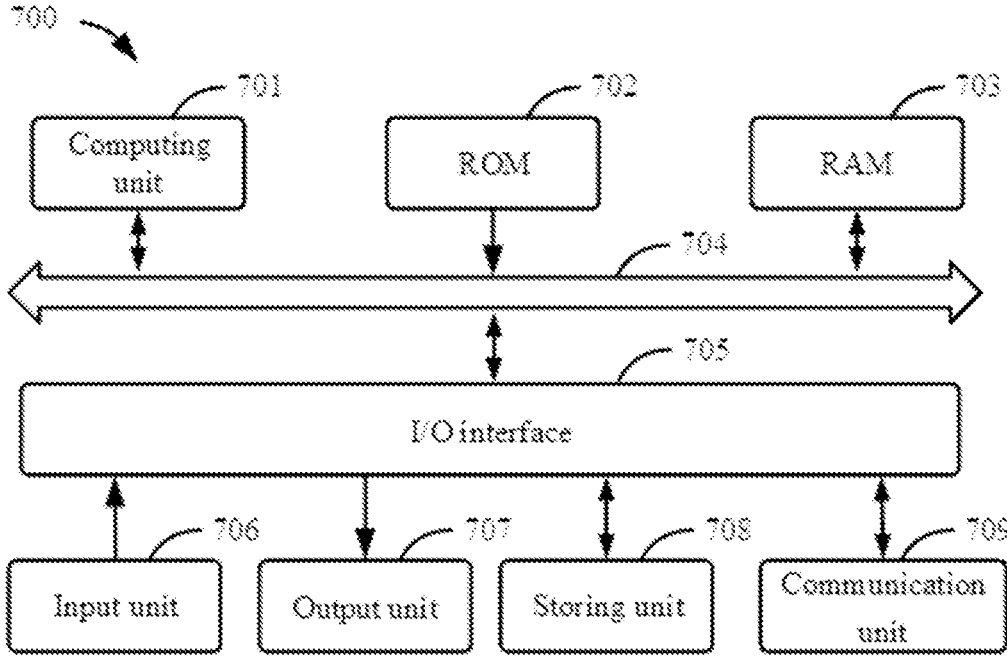
FIG. 7 shows a structural block diagram of an example electronic device able to be used to implement an embodiment of the present disclosure.

According to another aspect of the present disclosure, a decision-making apparatus for an autonomous vehicle based on simulation evaluation is further provided. FIG. 6 shows a structural block diagram of a training apparatus 600 of a decision-making model for an autonomous vehicle according to an example embodiment of the present disclosure. As shown in FIG. 7, the apparatus 600 includes:

a fourth obtaining unit 601, configured to obtain first sample traveling state information of the autonomous vehicle and first sample motion state information of a traffic object;

an inputting unit 602, configured to input the first sample traveling state information of the autonomous vehicle and the first sample motion state information of the traffic object into the decision-making model for the autonomous vehicle to obtain the first predictive control decision output by the decision-making model for the autonomous vehicle, wherein the decision-making model for the autonomous vehicle is configured to obtain the first predictive control decision through the following steps: the first sample traveling state information of the autonomous vehicle and the first sample motion state information of the traffic object are input into the automatic driving decision-making model to obtain a fourth control decision output by the automatic driving decision-making model, wherein the fourth control decision indicates whether the autonomous vehicle is to avoid the traffic object; the first sample motion state information of the traffic object and the fourth control decision are input into the motion state prediction model to obtain third predictive motion state information of the traffic object within a third preset duration output by the motion state prediction model; and the first sample traveling state information of the autonomous vehicle and the third predictive motion state information of the traffic object are input into the automatic driving decision-making model to obtain the first predictive control decision output by the automatic driving decision-making model;

an evaluating unit 603, configured to evaluate the first predictive control decision in a simulation scenario in which the first predictive control decision is executed by the autonomous vehicle to obtain an evaluation result of the first predictive control decision for the simulation scenario, wherein the evaluation result indicates whether a traveling behavior of the autonomous vehicle executing the first predictive control decision meets a threshold; and a parameter adjusting unit 604, configured to adjust parameters of the decision-making model for the autonomous vehicle based on the evaluation result.

According to some embodiments, the apparatus 600 further includes: a marking unit, configured to determine a label for the first predictive control decision based on the evaluation result, wherein the label indicates that the first predictive control decision is a positive sample or a negative sample; wherein the fourth obtaining unit 601 is further configured to obtain second sample traveling state information of the autonomous vehicle and second sample motion state information of the traffic object when the autonomous vehicle executes the first predictive control decision in the simulation scenario; the inputting unit 602 is further configured to input the second sample traveling state information of the autonomous vehicle and the second sample motion state information of the traffic object into the decision-making model for the autonomous vehicle to obtain a second predictive control decision output by the decision-making model for the autonomous vehicle; and the parameter adjusting unit 604 is further configured to adjust parameters of the decision-making model for the autonomous vehicle based on the first predictive control decision, the label and the second predictive control decision.

The operation of the unit 601-unit 604 of the training apparatus 600 of the decision-making model for the autonomous vehicle is similar to the operation of step S401-step S404 described previously, which will not be repeated here.

According to another aspect of the present disclosure, an autonomous vehicle is further provided, including the apparatus 500 described above.

According to another aspect of the present disclosure, an electronic device is further provided, including: at least one processor; and a memory in communication connection with the at least one processor, wherein the memory stores instructions executable by the at least one processor, and the instructions are executed by the at least one processor, so that the at least one processor is able to execute the above decision-making method for the autonomous vehicle or the training method of the decision-making model for the autonomous vehicle.

According to another aspect of the present disclosure, a non-transient computer readable storage medium storing computer instructions is further provided, wherein the computer instructions are used to cause a computer to execute the above decision-making method for the autonomous vehicle or the training method of the decision-making model for the autonomous vehicle.

According to another aspect of the present disclosure, a computer program product is further provided, including a computer program, wherein the computer program, when executed by a processor, implements the above decision-making method for the autonomous vehicle or the training method of the decision-making model for the autonomous vehicle.

Referring to FIG. 7, a structural block diagram of an electronic device 700 which can serve as a server or a client of the present disclosure will now be described, which is an example of a hardware device capable of being applied to all aspects of the present disclosure. The electronic device aims to express various forms of digital-electronic computer devices, such as a laptop computer, a desk computer, a work bench, a personal digital assistant, a server, a blade server, a mainframe computer and other proper computers. The electronic device may further express various forms of mobile apparatuses, such as a personal digital assistant, a cellular phone, an intelligent phone, a wearable device and other similar computing apparatuses. Parts shown herein, their connection and relations, and their functions only serve as an example, and are not intended to limit implementation of the present disclosure described and/or required herein.

As shown in FIG. 7, the device 700 includes a computing unit 701, which may execute various proper actions and processing according to a computer program stored in a read-only memory (ROM) 702 or a computer program loaded from a storing unit 708 to a random access memory (RAM) 703. In the RAM 703, various programs and data required by operation of the device 700 may further be stored. The computing unit 701, the ROM 702 and the RAM 703 are connected with one another through a bus 704. An input/output (I/O) interface 705 is also connected to the bus 704.

A plurality of parts in the device 700 are connected to the I/O interface 705, and including: an input unit 706, an output unit 707, the storing unit 708 and a communication unit 709. The input unit 706 may be any type of device capable of inputting information to the device 700, the input unit 706 may receive input digital or character information, and generates key signal input relevant to user setting and/or functional control of the electronic device, and may include but is not limited to a mouse, a keyboard, a touch screen, a trackpad, a trackball, an operating lever, a microphone and/or a remote control. The output unit 707 may be any type of device capable of presenting information, and may include but is not limited to a display, a loudspeaker, a video/audio output terminal, a vibrator and/or a printer. The storing unit 708 may include but is not limited to a magnetic disc and an optical disc. The communication unit 709 allows the device 700 to exchange information/data with other devices through a computer network such as Internet and/or various telecommunication networks, and may include but is not limited to a modem, a network card, an infrared communication device, a wireless communication transceiver and/or a chip set, such as a Bluetooth™ device, a 802.11 device, a WiFi device, a WiMax device, a cellular communication device and/or analogues.

The computing unit 701 may be various general and/or dedicated processing components with processing and computing capabilities. Some examples of the computing unit 701 include but are not limited to a central processing unit (CPU), a graphic processing unit (GPU), various dedicated artificial intelligence (AI) computing chips, various computing units running a machine learning model algorithm, a digital signal processor (DSP), and any proper processor, controller, microcontroller, etc. The computing unit 701 executes all the methods and processing described above, such as the decision-making method for the autonomous vehicle or the training method of the decision-making model for the autonomous vehicle. For example, in some embodiments, the decision-making method for the autonomous vehicle or the training method of the decision-making model for the autonomous vehicle may be implemented as a computer software program, which is tangibly contained in a machine readable medium, such as the storing unit 708. In some embodiments, part or all of the computer programs may be loaded into and/or mounted on the device 700 via the ROM 702 and/or the communication unit 709. When the computer program is loaded to the RAM 703 and executed by the computing unit 701, one or more steps of the decision-making method for the autonomous vehicle or the training method of the decision-making model for the autonomous vehicle described above may be executed. Alternatively, in other embodiments, the computing unit 701 may be configured to execute the decision-making method for the autonomous vehicle or the training method of the decision-making model for the autonomous vehicle through any other proper modes (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN), the Internet and a blockchain network.

A computer system may include a client and a server. The client and the server are generally away from each other and usually interact through a communication network. A relationship of the client and the server is generated through computer programs running on a corresponding computer and mutually having a client-server relationship. The server may be a cloud server or a server of a distributed system, or a server in combination with a blockchain.

It should be understood that various forms of flows shown above may be used to reorder, increase or delete the steps. For example, all the steps recorded in the present disclosure may be executed in parallel, and may also be executed sequentially or in different sequences, as long as the expected result of the technical solution disclosed by the present disclosure may be implemented, which is not limited herein.

Although the embodiments or examples of the present disclosure have been described with reference to the accompanying drawings, it should be understood that the above method, system and device are only example embodiments or examples, and the scope of the present disclosure is not limited by these embodiments or examples, but only limited by the authorized claim and equivalent scope thereof. Various elements in the embodiments or the examples may be omitted or may be replaced with their equivalent elements. In addition, all the steps may be executed through the sequence different from that described in the present disclosure. Further, various elements in the embodiments or the examples may be combined in various modes. It is important that with evolution of the technology, many elements described here may be replaced with the equivalent element appearing after the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A decision-making method for an autonomous vehicle, comprising:

detecting, by one or more sensors, a traveling state of the autonomous vehicle to obtain travel state information of the autonomous vehicle;

detecting, by one or more sensors, in response to detecting that there is a traffic object within a first range for the autonomous vehicle, a motion state of the traffic object to obtain a true motion state information of the traffic object;

determining a first control decision based on the traveling state information of the autonomous vehicle and the true motion state information of the traffic object, wherein the first control decision indicates whether the autonomous vehicle is to avoid the traffic object;

predicting first predictive motion state information of the traffic object within a first duration based on the true motion state information of the traffic object and the first control decision;

determining a second control decision for the autonomous vehicle based on the traveling state information of the autonomous vehicle and the first predictive motion state information of the traffic object;

predicting second predictive motion state information of the traffic object within a second duration based on the true motion state information of the traffic object and the second control decision;

determining a third control decision for the autonomous vehicle based on the traveling state information of the autonomous vehicle and the second predictive motion state information of the traffic object; and controlling actuators in the autonomous vehicle based on the third control decision.

2. The method according to claim 1, wherein the detecting the motion state of the traffic object includes detecting the motion state of one or more of a pedestrian, a non-motor vehicle or a motor vehicle.

3. The method according to claim 1, wherein the determining the first control decision based on the traveling state information of the autonomous vehicle and the true motion state information of the traffic object comprises:

inputting the traveling state information of the autonomous vehicle and the true motion state information of the traffic object into an automatic driving decision-making model to obtain the first control decision output by the automatic driving decision-making model, and wherein, the determining the second control decision for the autonomous vehicle based on the traveling state information of the autonomous vehicle and the first predictive motion state information of the traffic object comprises:

inputting the traveling state information of the autonomous vehicle and the first predictive motion state information of the traffic object into the automatic driving decision-making model to obtain the second control decision output by the automatic driving decision-making model.

4. The method according to claim 1, wherein the predicting the first predictive motion state information of the traffic object within the first duration based on the true motion state information of the traffic object and the first control decision comprises:

inputting the true motion state information of the traffic object and the first control decision into a motion state prediction model to obtain the first predictive motion state information output by the motion state prediction model.

5. The method according to claim 1, further comprising:

obtaining a traveling scenario information, wherein the traveling scenario information indicates a motion restriction information for the autonomous vehicle and the traffic object in a traveling scenario, and wherein, the determining the first control decision based on the traveling state information of the autonomous vehicle and the true motion state information of the traffic object comprises:

determining the first control decision based on the traveling state information of the autonomous vehicle, the true motion state information of the traffic object and the traveling scenario information, and wherein, the predicting the first predictive motion state information of the traffic object within the first duration based on the true motion state information of the traffic object and the first control decision comprises:

predicting the first predictive motion state information of the traffic object within the first duration based on the true motion state information of the traffic object, the first control decision and the traveling scenario information.

6. The method according to claim 3, wherein the predicting the first predictive motion state information of the traffic object within the first duration based on the true motion state information of the traffic object and the first control decision comprises:

inputting the true motion state information of the traffic object and the first control decision into the motion state prediction model to obtain the first predictive motion state information output by the motion state prediction model, and wherein, the automatic driving decision-making model and the motion state prediction model is trained through following actions:

obtaining first sample traveling state information of the autonomous vehicle and first sample motion state information of the traffic object;

inputting the first sample traveling state information of the autonomous vehicle and the first sample motion state information of the traffic object into the decision-making model for the autonomous vehicle to obtain a first predictive control decision output by the decision-making model for the autonomous vehicle, wherein the decision-making model for the autonomous vehicle is configured to obtain the first predictive control decision through the following actions:

inputting the first sample traveling state information of the autonomous vehicle and the first sample motion state information of the traffic object into the automatic driving decision-making model to obtain a fourth control decision output by the automatic driving decision-making model, wherein the fourth control decision indicates whether the autonomous vehicle is to avoid the traffic object;

inputting the first sample motion state information of the traffic object and the fourth control decision into the motion state prediction model to obtain third predictive motion state information of the traffic object within a third duration output by the motion state prediction model; and inputting the first sample traveling state information of the autonomous vehicle and the third predictive motion state information of the traffic object into the automatic driving decision-making model to obtain the first predictive control decision output by the automatic driving decision-making model;

evaluating the first predictive control decision in a simulation scenario in which the first predictive control decision is executed by the autonomous vehicle to obtain an evaluation result of the first predictive control decision for the simulation scenario, wherein the evaluation result indicates whether a traveling behavior of the autonomous vehicle executing the first predictive control decision meets a threshold; and adjusting parameters of the decision-making model for the autonomous vehicle based on the evaluation result.

7. The method according to claim 6, wherein the actions further comprise:

determining a label for the first predictive control decision based on the evaluation result, wherein the label indicates whether the first predictive control decision is a positive sample or a negative sample;

obtaining second sample traveling state information of the autonomous vehicle and second sample motion state information of the traffic object when the autonomous vehicle executes the first predictive control decision in the simulation scenario;

inputting the second sample traveling state information of the autonomous vehicle and the second sample motion state information of the traffic object into the decision-making model for the autonomous vehicle to obtain a second predictive control decision output by the decision-making model for the autonomous vehicle; and adjusting parameters of the decision-making model for the autonomous vehicle based on the first predictive control decision, the label and the second predictive control decision.

8. An electronic device, comprising:

one or more processors;

a memory storing one or more programs configured to be executed by the one or more processors, the one or more programs including instructions that when executed by the one or processors enable the one or more processor to implement actions including:

causing one or more sensors to detect a traveling state of the autonomous vehicle to obtain travel state information of the autonomous vehicle;

causing one or more sensors to detect, in response to detecting that there is a traffic object within a first range for the autonomous vehicle, a motion state of the traffic object to obtain true motion state information of the traffic object;

determining a first control decision based on the traveling state information of the autonomous vehicle and the true motion state information of the traffic object, wherein the first control decision indicates whether the autonomous vehicle is to avoid the traffic object;

predicting first predictive motion state information of the traffic object within a first duration based on the true motion state information of the traffic object and the first control decision;

determining a second control decision for the autonomous vehicle based on the traveling state information of the autonomous vehicle and the first predictive motion state information of the traffic object;

predicting second predictive motion state information of the traffic object within a second duration based on the true motion state information of the traffic object and the second control decision;

determining a third control decision for the autonomous vehicle based on the traveling state information of the autonomous vehicle and the second predictive motion state information of the traffic object; and controlling actuators in the autonomous vehicle based on the third control decision.

9. The electronic device according to claim 8, wherein the detecting the motion state of the traffic object includes detecting the motion state of one or more of a pedestrian, a non-motor vehicle or a motor vehicle.

10. The electronic device according to claim 8, wherein the determining the first control decision based on the traveling state information of the autonomous vehicle and the true motion state information of the traffic object comprises:

inputting the traveling state information of the autonomous vehicle and the true motion state information of the traffic object into an automatic driving decision-making model to obtain the first control decision output by the automatic driving decision-making model, and wherein, determining the second control decision for the autonomous vehicle based on the traveling state information of the autonomous vehicle and the first predictive motion state information of the traffic object comprises:

inputting the traveling state information of the autonomous vehicle and the first predictive motion state information of the traffic object into the automatic driving decision-making model to obtain the second control decision output by the automatic driving decision-making model.

11. The electronic device according to claim 8, wherein predicting the first predictive motion state information of the traffic object within the preset duration based on the true motion state information of the traffic object and the first control decision comprises:

inputting the true motion state information of the traffic object and the first control decision into a motion state prediction model to obtain the first predictive motion state information output by the motion state prediction model.

12. The electronic device according to claim 8, wherein the actions further include:

obtaining traveling scenario information, wherein the traveling scenario information indicates motion restriction information for the autonomous vehicle and the traffic object in a traveling scenario, wherein the determining the first control decision based on the traveling state information of the autonomous vehicle and the true motion state information of the traffic object comprises:

determining the first control decision based on the traveling state information of the autonomous vehicle, the true motion state information of the traffic object and the traveling scenario information, and wherein the predicting the first predictive motion state information of the traffic object within the first duration based on the true motion state information of the traffic object and the first control decision comprises:

predicting the first predictive motion state information of the traffic object within the first duration based on the true motion state information of the traffic object, the first control decision and the traveling scenario information.

13. The electronic device according to claim 10, wherein the predicting the first predictive motion state information of the traffic object within the first duration based on the true motion state information of the traffic object and the first control decision comprises:

inputting the true motion state information of the traffic object and the first control decision into a motion state prediction model to obtain the first predictive motion state information output by the motion state prediction model, and wherein the automatic driving decision-making model and the motion state prediction model is trained through following actions:

obtaining first sample traveling state information of the autonomous vehicle and first sample motion state information of the traffic object;

inputting the first sample traveling state information of the autonomous vehicle and the first sample motion state information of the traffic object into the decision-making model for the autonomous vehicle to obtain a first predictive control decision output by the decision-making model for the autonomous vehicle, wherein the decision-making model for the autonomous vehicle is configured to obtain the first predictive control decision through the following actions:

inputting the first sample traveling state information of the autonomous vehicle and the first sample motion state information of the traffic object into the automatic driving decision-making model to obtain a fourth control decision output by the automatic driving decision-making model, wherein the fourth control decision indicates whether the autonomous vehicle is to avoid the traffic object;

inputting the first sample motion state information of the traffic object and the fourth control decision into the motion state prediction model to obtain third predictive motion state information of the traffic object within a third duration output by the motion state prediction model; and inputting the first sample traveling state information of the autonomous vehicle and the third predictive motion state information of the traffic object into the automatic driving decision-making model to obtain the first predictive control decision output by the automatic driving decision-making model;

evaluating the first predictive control decision in a simulation scenario in which the first predictive control decision is executed by the autonomous vehicle to obtain an evaluation result of the first predictive control decision for the simulation scenario, wherein the evaluation result indicates whether a traveling behavior of the autonomous vehicle executing the first predictive control decision meets a threshold; and adjusting parameters of the decision-making model for the autonomous vehicle based on the evaluation result.

14. The electronic device according to claim 13, wherein the actions further comprise:

determining a label for the first predictive control decision based on the evaluation result, wherein the label indicates that the first predictive control decision is a positive sample or a negative sample;

obtaining second sample traveling state information of the autonomous vehicle and second sample motion state information of the traffic object when the autonomous vehicle executes the first predictive control decision in the simulation scenario;

inputting the second sample traveling state information of the autonomous vehicle and the second sample motion state information of the traffic object into the decision-making model for the autonomous vehicle to obtain a second predictive control decision output by the decision-making model for the autonomous vehicle; and adjusting parameters of the decision-making model for the autonomous vehicle based on the first predictive control decision, the label and the second predictive control decision.

15. A non-transitory computer-readable storage medium storing one or more programs, the one or more programs comprising instructions, which when executed by one or more processors of an electronic device, cause the electronic device to:

detect, by one or more sensors, a traveling state of the autonomous vehicle to obtain travel state information of the autonomous vehicle;

detect, by one or more sensors, in response to detecting that there is a traffic object within a first range for the autonomous vehicle, a motion state of the traffic object to obtain true motion state information of the traffic object;

determine a first control decision based on the traveling state information of the autonomous vehicle and the true motion state information of the traffic object, wherein the first control decision indicates whether the autonomous vehicle is to avoid the traffic object;

predict first predictive motion state information of the traffic object within a first preset duration based on the true motion state information of the traffic object and the first control decision;

determine a second control decision for the autonomous vehicle based on the traveling state information of the autonomous vehicle and the first predictive motion state information of the traffic object;

predict second predictive motion state information of the traffic object within a second duration based on the true motion state information of the traffic object and the second control decision;

determine a third control decision for the autonomous vehicle based on the traveling state information of the autonomous vehicle and the second predictive motion state information of the traffic object; and controlling actuators in the autonomous vehicle based on the third control decision.

16. The computer-readable storage medium according to claim 15, wherein the detecting the motion state of the traffic object includes detecting the motion state of one or more of a pedestrian, a non-motor vehicle or a motor vehicle.

17. The computer-readable storage medium according to claim 15, wherein the determining the first control decision based on the traveling state information of the autonomous vehicle and the true motion state information of the traffic object comprises:

inputting the traveling state information of the autonomous vehicle and the true motion state information of the traffic object into an automatic driving decision-making model to obtain the first control decision output by the automatic driving decision-making model, and wherein, determining the second control decision for the autonomous vehicle based on the traveling state information of the autonomous vehicle and the first predictive motion state information of the traffic object comprises:

inputting the traveling state information of the autonomous vehicle and the first predictive motion state information of the traffic object into the automatic driving decision-making model to obtain the second control decision output by the automatic driving decision-making model.

18. The computer-readable storage medium according to claim 15, wherein the predicting the first predictive motion state information of the traffic object within the first duration based on the true motion state information of the traffic object and the first control decision comprises:

inputting the true motion state information of the traffic object and the first control decision into a motion state prediction model to obtain the first predictive motion state information output by the motion state prediction model.

19. The computer-readable storage medium according to claim 15, wherein the electronic device is further caused to:

obtain a traveling scenario information, wherein the traveling scenario information indicates a motion restriction information for the autonomous vehicle and the traffic object in a traveling scenario, and wherein, the determining the first control decision based on the traveling state information of the autonomous vehicle and the true motion state information of the traffic object comprises:

determining the first control decision based on the traveling state information of the autonomous vehicle, the true motion state information of the traffic object and the traveling scenario information, and wherein, the predicting the first predictive motion state information of the traffic object within the first duration based on the true motion state information of the traffic object and the first control decision comprises:

predicting the first predictive motion state information of the traffic object within the first duration based on the true motion state information of the traffic object, the first control decision and the traveling scenario information.

20. The computer-readable storage medium according to claim 17, wherein the predicting the first predictive motion state information of the traffic object within the first duration based on the true motion state information of the traffic object and the first control decision comprises:

inputting the true motion state information of the traffic object and the first control decision into the motion state prediction model to obtain the first predictive motion state information output by the motion state prediction model, and wherein, the automatic driving decision-making model and the motion state prediction model is trained through following actions:

obtaining first sample traveling state information of the autonomous vehicle and first sample motion state information of the traffic object;

inputting the first sample traveling state information of the autonomous vehicle and the first sample motion state information of the traffic object into the decision-making model for the autonomous vehicle to obtain a first predictive control decision output by the decision-making model for the autonomous vehicle, wherein the decision-making model for the autonomous vehicle is configured to obtain the first predictive control decision through the following actions:

inputting the first sample traveling state information of the autonomous vehicle and the first sample motion state information of the traffic object into the automatic driving decision-making model to obtain a fourth control decision output by the automatic driving decision-making model, wherein the fourth control decision indicates whether the autonomous vehicle is to avoid the traffic object;

inputting the first sample motion state information of the traffic object and the fourth control decision into the motion state prediction model to obtain third predictive motion state information of the traffic object within a third duration output by the motion state prediction model; and inputting the first sample traveling state information of the autonomous vehicle and the third predictive motion state information of the traffic object into the automatic driving decision-making model to obtain the first predictive control decision output by the automatic driving decision-making model;

evaluating the first predictive control decision in a simulation scenario in which the first predictive control decision is executed by the autonomous vehicle to obtain an evaluation result of the first predictive control decision for the simulation scenario, wherein the evaluation result indicates whether a traveling behavior of the autonomous vehicle executing the first predictive control decision meets a threshold; and adjusting parameters of the decision-making model for the autonomous vehicle based on the evaluation result.

* * * * *